3,184,497
Patented May 18, 1965

3,184,497
TRIS(DIHYDROXYALKYL) PHOSPHATES
Karl Brack, Wilmington, Del., assignor to Hercules Powder Company, Wilmington, Del., a corporation of Delaware
No Drawing. Filed Mar. 25, 1963, Ser. No. 267,816
3 Claims. (Cl. 260—461)

This invention relates to tris(dihydroxyalkyl) esters of phosphoric acid prepared by the reaction of an epoxy alcohol with phosphoric acid and to their use in the preparation of flame-resistant materials.

It has previously been known that epoxy alcohols could be reacted with phosphoryl chlorides to produce epoxy esters of phosphoric acid, the reaction taking place between the alcohol group of the epoxy alcohol and the chlorine of the phosphoryl chloride.

Now in accordance with this invention it has surprisingly been found that when an epoxy alcohol is reacted with phosphoric acid, the reaction takes place with the epoxy group of the epoxy alcohol and the acidic hydrogen of the phosphoric acid, whereby there is produced a tris(dihydroxyalkyl) ester of phosphoric acid instead of the epoxy esters previously produced. The reaction which takes place in accordance with this invention may be set forth as

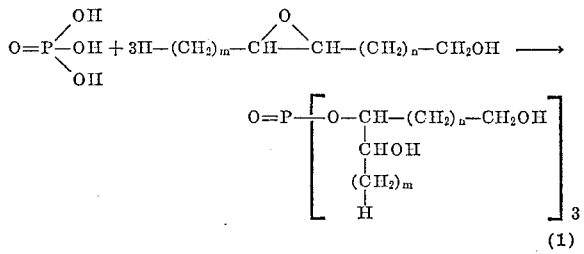

(1)

where $m$ and $n$ are whole numbers of from 0 to 10 and which can be alike or different and the sum of $m+n$ is 3 to 14. Since either of the epoxy oxygen-to-carbon bonds can react, there can also be produced the isomeric ester.

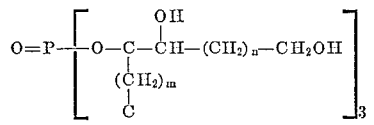

(2)

as well as the mixed esters having the formula

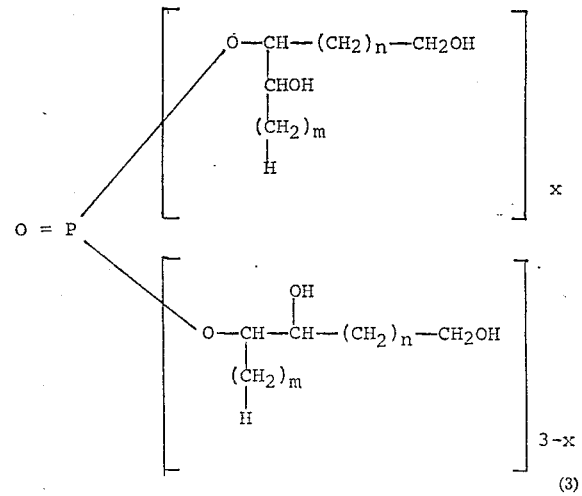

(3)

where $x$ may be 1 or 2. Thus, the new tris(dihydroxyalkyl) esters of phosphoric acid of this invention may be said to have the formula set forth in (3) wherein $x$ can be 0 to 3.

The new hexahydroxy phosphoric acid esters of this invention are valuable new products which are useful in the preparation of flame-resistant coatings and urethane foams.

Any aliphatic epoxy alcohol containing at least 6 carbon atoms may be used to prepare the new hexahydroxy phosphoric acid esters useful in the production of flame-resistant coatings and urethane foams. Thus, the epoxy alcohols reacted with phosphoric acid in accordance with this invention will have the general formula

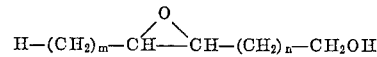

where $m$ and $n$ are whole numbers of from 0 to 10 and which can be alike or different and wherein the sum of $m+n$ is from 3 to 14. Exemplary of these epoxy alcohols are 3,4-epoxyhexanol, 4,5-epoxyheptanol, 9,10-epoxydecanol, 10,11-epoxyundecanol, 4,5-epoxytetradecanol, 8,9-epoxyhexadecanol, 9,10-epoxyoctadecanol, etc.

The reaction between the epoxy alcohol and phosphoric acid to produce the new hexahydroxy phosphoric acid esters of this invention is readily carried out by mixing the two reagents and heating the mixture to a temperature of from about 30° C. to about 180° C. until the esterification reaction is complete. To insure complete esterification of the acid there will generally be used at least about 3 moles of the epoxyalcohol per mole of acid, but obviously much higher ratios can be used. An inert diluent is preferably used in carrying out the reaction to obtain a homogeneous reaction mixture, but the reaction can be carried out without a diluent. Suitable diluents that can be used are benzene, toluene, diethyl ether, dioxane, tetrahydrofuran, dimethyl sulfoxide, dimethyl formamide, dimethyl ether of diethylene glycol, etc. While catalysts are not necessary to bring about the reaction, it is frequently desirable to add a catalyst in order to speed up the reaction. Exemplary of the catalysts that may be used are alkali metal alkoxides such as sodium methoxide, potassium tert.-butoxide, etc., amines such as triethylenediamine, trimethylbenzylammonium hydroxide, etc., and salts of heavy metals such as cobalt acetate, mercuric acetate, etc.

The following examples will illustrate the preparation of the new hexahydroxy phosphoric acid esters of this invention and their use in the preparation of flame-resistant films and polyurethane foams. All parts and percentages are by weight unless otherwise indicated.

*Example 1*

Fifty-six (56.0) parts of 9,10-epoxyoctadecanol, 200 parts of benzene, and 7 parts of 85% phosphoric acid were mixed and heated to reflux for 12 hours in a vessel equipped with a water separator. During this time 1.3 parts of water (introduced into the reaction mixture with the 85% phosphoric acid) were collected. On cooling some white precipitate formed. The reaction mixture was filtered and the solid was dried. It amounted to 10.4 parts and consisted mostly of unreacted 9,10-epoxyoctadecanol. The diluent was removed from the filtrate by distillation, leaving 49.2 parts of viscous oil as the product. On analysis the tris(dihydroxyoctadecyl) phosphate so obtained was found to contain 3.4% phosphorus, 68.58% carbon, 9.25% active hydrogen (as hydroxyl). It had an acid number of 21.8 and an ester number of 162.

*Example 2*

To a mixture of 2.8 parts of phosphoric acid (prepared from 2.0 parts of 85% phosphoric acid and 0.8 parts of phosphorus pentoxide) and 90 parts of tetrahydrofuran, was added a solution of 35.0 parts of 9,10-epoxyoctadecanol (5.45%) oxirane oxygen and 97% pure) in 90 parts of tetrahydrofuran. The reaction mixture was stirred and heated at reflux temperature. The reaction was followed by titration of aliquots for acid and oxirane oxygen. After 6 hours 95% of the phosphoric acid and 70% of the oxirane oxygen had reacted. The heating was discontinued, after which the reaction mixture was stirred at room temperature with 10 parts of basic alumina for 2 hours to remove the unreacted and partially reacted phosphoric acid. After filtering, the diluent was removed from the clean solution by distillation. There was obtained 30.1 parts of a white, wax-like solid. This was extracted 3 times with 66 parts of n-hexane to remove the excess 9,10-epoxyoctadecanol. The hexane-insoluble tris(dihydroxyoctadecyl) phosphate so obtained was a white solid which amounted to 22.6 parts after drying under vacuum. On analysis it was found to contain 2.6% phosphorus, 12.2% active hydrogen (as hydroxyl), and had an acid number of 1.0.

*Example 3*

To a mixture of 2.8 parts of phosphoric acid (prepared from 2.0 parts of 85% phosphoric acid and 0.8 part of phosphorus pentoxide) and 90 parts of tetrahydrofuran was added 18.6 parts of 10,11-epoxyundecanol (8.0% oxirane oxygen and 93% pure) dissolved in 17.5 parts of tetrahydrofuran. The reaction mixture was stirred at room temperature for about 17 hours. Titration of an aliquot showed that it had an acid number of 16.3 and an oxirane oxygen content of 0.56%, indicating that about 56% of the phosphoric acid and about 50% of the epoxide had reacted. The reaction mixture was then heated to reflux for 2 hours. At this time the acid number had dropped to 3.0, and the oxirane oxygen content was 0.09%. The solvent was removed by distillation under reduced pressure. The residue was extracted three times with 88 parts of benzene to remove the excess 10,11-epoxyundecanol. The benzene-insoluble product was freed of all traces of solvents under reduced pressure at 100° C. The tris(dihydroxyundecyl) phosphate so obtained was a white, wax-like solid which amounted to 16.3 parts. It had an acid number of 2.5, and it contained 4.5% phosphorus and 14.3% active hydrogen (as hydroxyl).

*Example 4*

Five (5.0) parts of 85% phosphoric acid and 175 parts of benzene were mixed, stirred, and heated to reflux in a vessel equipped with a water separator, whereby 0.9 parts of water was collected. To this mixture was then added 29.1 parts of 10,11-epoxyundecanol. The reaction mixture was stirred at room temperature for 16 hours and then was heated to reflux for 3 hours. After cooling to room temperature, the benzene layer was decanted from the resin which had settled out. The latter was extracted twice with 175 parts each of benzene to remove all of the excess 10,11-epoxyundecanol and all traces of solvent were then removed under reduced pressure at 100° C. The tris(dihydroxyundecyl) phosphate so obtained was a white waxy solid and amounted to 29.6 parts. It contained 4.2% phosphorus and 13.5% active hydrogen (as hydroxyl) and had a molecular weight of 630.

The following examples demonstrate the preparation of urethane films and foams from these hexahydroxy phosphoric acid esters.

*Example 5*

One part of the tris(dihydroxyoctadecyl) phosphate, prepared as described in Example 1, was dissolved in 10 parts of tetrahydrofuran, and 0.48 part of toluene diisocyanate was added. The solution was mixed well and a film was cast. After baking for 12 hours at 85° C. a clear, hard film was obtained, which was insoluble in solvents such as alcohol, ether, tetrahydrofuran, and methyl isobutyl ketone. This film was self-extinguishing; it shriveled, melted and charred while exposed to a flame, but stopped burning as soom as the flame was removed.

*Example 6*

Twenty-one and seven-tenths (21.7) parts of tris(dihydroxyoctadecyl) phosphate were mixed with 20.5 parts of toluene diisocyanate and 0.1 part of a silicone oil surfactant. Then 0.6 parts of distilled water containing 0.1 part of triethylenediamine as a catalyst was added. The mixture was stirred for five seconds, poured and allowed to foam up at room temperature. The soft foam so obtained was cured by heating at 85° C. for 1½ hours. A hard, somewhat brittle foam was obtained. The foam was flame resistant. It melted and charred while exposed to the flame but stopped burning as soon as the flame was removed.

*Example 7*

Tris(dihydroxyundecyl) phosphate (0.625) part) was dissolved in 9 parts of tetrahydrofuran and 0.48 part of toluene diisocyanate was added. The mixture was stirred until it was homogeneous, and then a film was cast on a glass plate. The film was cured by baking at 100° C. for one hour. A clear, hard film, which could not be scratched with a fingernail, was obtained. The film was insoluble in tetrahydrofuran, methyl isobutyle ketone, and alcohol. When exposed to a flame, the film was self-extinguishing, i.e., it would not support combustion by itself.

What I claim and desire to protect by Letters Patent is:

1. A tris(dihydroxyalkyl) ester of phosphoric acid having the formula

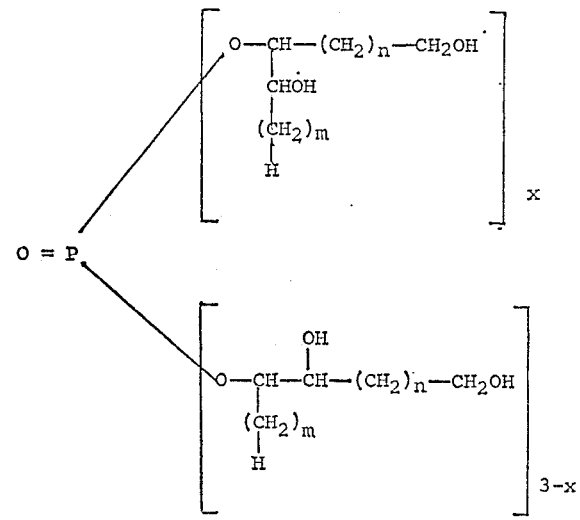

where $m$ and $n$ are whole numbers of from 0 to 10 and the sum of $m+n$ is from 3 to 14 and $x$ is a whole number from 0 to 3.

2. A tris(dihydroxyoctadecyl) ester of phosphoric acid.
3. A tris(dihydroxyundecyl) ester of phosphoric acid.

References Cited by the Examiner

UNITED STATES PATENTS

| | | | |
|---|---|---|---|
| 2,372,244 | 3/45 | Adams et al. | 260—461 |
| 2,830,069 | 4/58 | Smith | 260—461 |
| 3,094,549 | 6/63 | Gurgiolo et al. | 260—461 |

CHARLES B. PARKER, *Primary Examiner.*

UNITED STATES PATENT OFFICE
CERTIFICATE OF CORRECTION

Patent No. 3,184,497                                                          May 18, 1965

Karl Brack

It is hereby certified that error appears in the above numbered patent requiring correction and that the said Letters Patent should read as corrected below.

Column 1, lines 42 to 46, the formula should appear as shown below instead of as in the patent:

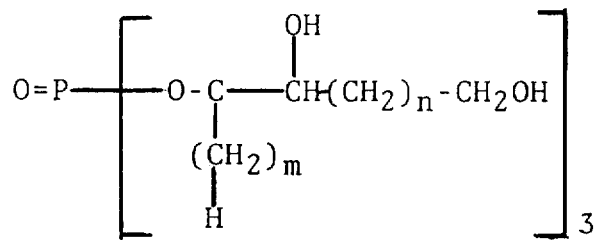

column 2, line 71, after "5.45%" strike out the closing parenthesi
column 4, line 21, after "0.625" strike out the closing parenthesi Signed and sealed this 5th day of October 1965.

(SEAL)
Attest:

ERNEST W. SWIDER                                        EDWARD J. BRENNER
Attesting Officer                                     Commissioner of Patents